April 20, 1954    F. W. VOGEL    2,675,954
DRINKING CUP
Filed March 3, 1952

Sect. III-III

Sect. IV-IV

Inventor
Frank W. Vogel

Patented Apr. 20, 1954

2,675,954

UNITED STATES PATENT OFFICE 2,675,954

DRINKING CUP

Frank W. Vogel, Hillside, Md.

Application March 3, 1952, Serial No. 274,572

1 Claim. (Cl. 229—14)

While the invention is here shown and described as more particularly embodied in a drinking cup, it will be understood that it is applicable also to various other types of containers for liquds and foods.

My invention has for its object the provision of a container that has a dead air space to give it heat-insulating properties and which may, nevertheless, be made so cheaply that it can be discarded after one use, the container also having greater mechanical strength than the paper cups and containers ordinarily found at soda fountains.

Figure 1:
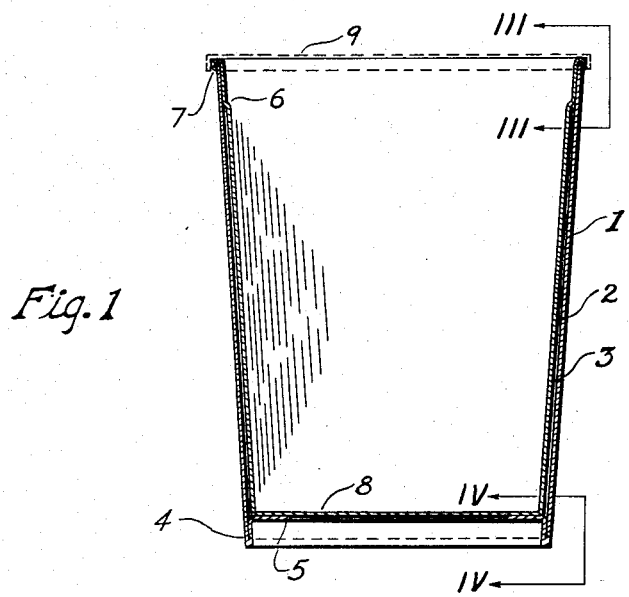
Figure 2:
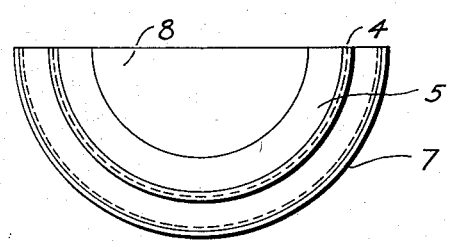
Figure 3:
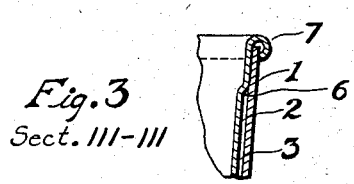
Figure 4:
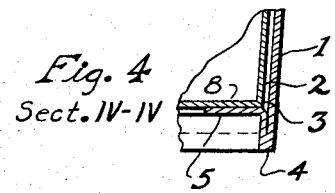

As shown in the accompanying drawing, Fig. 1 is a vertical sectional view through a cup embodying my invention; Fig. 2 is a partial plan view thereof; Fig. 3 is a section on the line III—III of Fig. 1 and Fig. 4 is a section on the line IV—IV of Fig. 1.

The article comprises an outer shell 1 of cup-like from and an inner cup-like receptacle 2, the two cup-like members being spaced apart throughout the major portion of their heights, to provide a dead air space as indicated at 3. The container 2 will preferably be formed or molded of paper-like material that is waterproof and resistant to hot liquids such as coffee and which also will not be adversely affected by iced liquids. The shell 1 can likewise be made of paper-like material, suitable for the printing of advertisements thereon, or designs can be formed thereon.

The shell 1 is shaped at its lower end to form a flange 4 at the juncture of its side wall and its bottom wall or lip 5.

The receptacle 2 is expanded somewhat near its upper end, as indicated at 6, to thereby provide the dead air space 3. The upper edge of the receptacle is curled or bent at 7, to not only provide a smooth lip or rim, but to effect better connection with the shell. This rolled edge 7 serves also to stiffen the container. The container 2 is adhesively connected to the shell 1 at the expanded area 6, to form a seal at the upper edge of the air space 3 and also giving additional strength to the structure. Similarly, the bottom 8 of the receptacle is adhesively connected to the annular lip 5. A suitable press-fit lid can also be used, and may be of any conventional type, as indicated by dash lines at 9.

I claim as my invention:

A receptacle of paper-like material comprising a cup-like shell of inverted frustro-conical shape whose lower edge portion is bent upwardly and radially inward to form a lip that is at a substantial distance above the lowermost plane of the shell, and a container within the shell positioned in the said lip, the upper edge of the container being curled outwardly in beaded form over the upper edge of the shell and in clamping engagement therewith, band-like areas near the upper ends of the shell and container walls being in face-contacting seating engagement with each other, and the remaining area of the container wall being offset inwardly and extending downwardly in spaced parallel relation to the shell walls, and the lower end of the container being adhesively connected to the said lip.

References Cited in the file of this patent

UNITED STATES PATENTS

| Number | Name | Date |
|---|---|---|
| 1,041,504 | Moore | Oct. 15, 1912 |
| 1,497,159 | Porter | June 10, 1924 |
| 1,771,765 | Benson | July 29, 1930 |
| 1,813,787 | Webster | July 7, 1931 |
| 1,955,745 | Hurley | Apr. 24, 1934 |
| 2,266,828 | Sykes | Dec. 23, 1941 |
| 2,484,608 | Cheyney et al. | Oct. 11, 1949 |